United States Patent Office 3,280,235
Patented Oct. 18, 1966

3,280,235
REDUCING BLOCK IN POLYMER FILMS
Gaylon L. Dighton, Lake Jackson, Nash A. Kidd, Freeport, and Jack R. Davis, Lake Jackson, Tex., assignors to The Dow Chemical Company, Midland, Mich., a corporation of Delaware
No Drawing. Filed June 5, 1964, Ser. No. 373,087
9 Claims. (Cl. 264—95)

This invention relates to method of reducing block in polymer films. More particularly, it relates to a method for producing polymer films having non-blocking characteristics wherein the anti-blocking agent is distributed only on the inside of a blown plastic bubble.

One of the problem occurring in the manufacture, handling and use of resinous polymers particularly in the form of thin films is the tendency of such products to block. Blocking is the property of two or more surfaces such as adjacent film layers in a roll or stack of film to adhere to each other particularly under pressure and to resist separation. Such behavior causes difficulties in, and often prevents, the unwinding of film from a roll, lifting of single sheets from a stack, opening of lay-flat tubing and collapsed bags, and like operations in handling and using such products.

It is an object of the present invention to provide a polymer film which possesses reduced tendency to block. It is another object to provide a process for producing polymer films with non-blocking characteristics. A more specific object is to provide a non-blocking film by a blown-film proces wherein an anti-blocking agent is distributed only on the inside of a blown plastic bubble. Other objects, advantages, features and variations will be apparent from the following description.

In accordance with the present invention, the above and other objects are attained in improvements in the blown bubble process by admixing a minor proportion of a monocarboxylic acid having from 12 to 22 carbon atoms per molecule with the starting film-forming polymer; extruding the resulting polymer mixture at an elevated temperature to form seamless plastic tubing, inflating the extruded tubing with a gaseous inflating agent to form a plastic bubble, said inflating agent containing an ingredient which reacts with the monocarboxylic acid on the inside surface of the plastic bubble to form an anti-blocking agent therein, cooling and thereafter collapsing said bubble by constricting means and collecting the flattened tubing.

In a preferred embodiment of the present invention, a minor proportion of a monocarboxylic acid such as stearic acid is mixed into an olefin polymer such as a polymer of ethylene by conventional means, the polymer mixture is extruded at a temperature above the melting point of the polymer to form a thin-walled plastic tubing; the extruded tubing is inflated with an ammonia-containing gas to form a plastic bubble, and the bubble is cooled and thereafter collapsed and the lay-flat tubing is collected.

The monocarboxylic acid can be mixed into the polymer by dry blending the components by conventional means such as a Banbury mixer, roll mill, drum tumbler and the like. The mixture is then compounded by extruding said mixture at a temperature of from about 300° F. to about 400° F. through a conventional extruding apparatus. Other methods suitable for blending the polymer and acid may also be employed.

Any of the known normally solid olefin polymers can be employed and improved in accordance with the present invention. Suitable olefin polymers include homopolymers, copolymers, terpolymers and blends thereof. Specific examples include polyethylene, polypropylene, poly(ethylene-vinylacetate-propylene), poly(ethyleneisobutyl acrylate), poly(ethylene-acrylic acid), poly(ethylene-ethyl acrylate) and the like.

Organic acids suitable for practicing the present invention include monocarboxylic acids containing from 12 to 22 carbon atoms per molecule. Examples of specific acids include lauric, tridecanoic, myristic, pentadecanoic, palmitic, heptadecanoic, stearic, nonadecanoic, eicosanoic, heneicosanoic and behenic. Dicarboxylic acids such as fumaric and sebasic acids have been found to be unsatisfactory in practcing this invention. Contacting such acids in a blown bubble with ammonia-containing inflating agent did not reduce the blocking characteristics of films thus formed.

Experimental tests show that preferred results are obtained when the monocarboxylic acid is present in the extruded polymer in an amount from about 0.02 percent to about 2 percent and preferably from about 0.1 percent to about 0.5 percent by weight based on the weight of the polymer.

Gaseous inflating agents suitable for inflating the extruded plastic bubble in accordance with this invention consist of or contain agents that react with the reactive groups of the monocarboxylic acid to produce the antiblock agent on the inside of the blown bubble. Examples of such gaseous inflating agents include ammonia gas, a mixture of ammonia and air, methyl amine, and the like, and also mixtures or combinations thereof.

Thin self-supporting films produced in accordance with the present invention exhibit a lesser tendency to block without affecting the clarity of the film so produced. Film products are advantageously used in packaging processes and fabricated collapsed bags made from such films are easily opened for filling due to the anti-block agent being distributed on the inside of the film tubing.

One of the more important advantages provided by the process of this invention is that, since the antiblock agent is distributed only on the inside of the fabricated film tubing, the outer surface remains free from foreign substances, such as anti-block agents, which would interfere with treating of film to promote ink adhesion where printing is desirable on said outer surface. The presence of the organic acid used in this invention bleeds to both the inner and outer surfaces of the blown plastic bubble and resulting lay-flat tubing; however, the acid has been found not to interfere with the treating of film to promote adhesion of printing inks.

The following examples are illustrative of the invention and are not intended to limit the scope thereof.

*Example 1*

Into the drum tumbler were placed 50 lbs. of a terpolymer of ethylene, vinyl acetate and propylene, and 22 grams of stearic acid. The mixture was blended for about thirty minutes. The blended mixture was further mixed by passing it through a mixing extruder at about 300° F. The blended resin was extruded through a 1½ inch extruder equipped with a 4-inch tubular film die to form a seamless tubing. The inflated tubing was then inflated with ammonia gas in an amount sufficient to form a resulting 11-inch lay-flat tubing. The inflated tubing was cooled, collapsed, and wound up in the usual manner. The rate of extrusion was about 150 grams per minute while the temperature of the polymer at the die orifice was about 350° F. Comparative tests were carried out with the air as the bubble-inflating gas and also with the starting terpolymer (absent the stearic acid) with air and with ammonia.

The resulting film products were tested as to their tendency to block and also as to the clarity of the films. The blocking test is carried out and the blocking value is determined as follows: two film holders, each having a square flat surface of 14 square inches covered with a sample of the film to be tested for blocking, are placed together with the test films in full contact in a horizontal plane but without pressure. The lower film holder is held fixedly while the upper film holder is suspended from one end of the beam of a beam balance and counterpoised so that there is a zero force between the film holders. The arrangement is such that weights applied to the balance beam exert a force tending to separate the film holders along a line normal to the contacting surfaces of the test film. The force in grams necessary to separate the film surfaces from contact with each other is taken as a measure of blocking, such force being proportionate to the tendency of the films to block.

The clarity test is carried out and the clarity value is determined as follows:

A narrow beam of light passing through slits passes through the film sample and the intensity of the transmitted light is measured by the voltage generated in a photocell. The photocell is driven across the transmitted beam from minimum intensity, through maximum intensity, and thence out again to minimum intensity. The photocell voltage is recorded on a standard recorder as one ordinate against cell travel as the other ordinate, thereby tracing a bell-shaped curve on the recorder chart. The apparatus is adjusted and calibrated so that, when no film is in the film holder (air transmission), the bell curve is nine inches high, i.e., the peak (maximum intensity) is nine inches above the base line (minimum intensity), and the width of the bell is approximately 1.3 inches when measured parallel to and 0.5 inch up from the base line. When the apparatus is so standardized, the operations are carried out with a test sample film in place in the film holder and the transmission curve is drawn for the film sample whose clarity is to be measured. From the resulting bell curve, the height (H) in inches of the peak (maximum intensity) of the bell above the base line is measured. The value of H is taken as a measure of film clarity. The highest clarity will have the highest H value since the transmitted light beam will be intense at maximum and sharp at the edges. Lack of clarity will be evident as a lower value of H.

All of the data in the examples of this application were determined on films whose thickness was approximately 1.5 mils.

In Table I below are shown the concentration of stearic acid in the polymer used in each test, the blocking value in grams and the clarity rating value for each of the film products. Only test 1 is exemplary of the invention. Tests 2 through 4 are for comparison.

TABLE I

| Test | P.p.m. of Stearic Acid | Inflating Agent | Blocking Value | Clarity Value |
|---|---|---|---|---|
| 1 | 2,500 | NH$_3$ | 5 | 7.0 |
| 2 | 2,500 | Air | 76 | 6.9 |
| 3 | 0 | Air | 62 | 6.6 |
| 4 | 0 | NH$_3$ | 63 | 6.6 |

From the above data, it can readily be seen that the absence of either the stearic acid or ammonia gas results in high blocking values. It can also be seen that no loss of clarity of the films results from producing films by the process of this invention.

*Example 2*

A film was prepared and tested in accordance with the process and methods employed in Example 1, test 1. Ammonia gas was used as the inflating agent. In this test, however, 2500 p.p.m. of lauric acid was used as the monocarboxylic acid in the starting plastic composition. The blocking value was found to be <5 and the clarity value was 6.2.

*Example 3*

A film was prepared and tested in accordance with the process and methods employed in Example 1, test 1, using ammonia gas as the bubble-inflating agent, except that 2500 p.p.m. palmitic acid was used as the monocarboxyilc acid in the plastic composition. The blocking value was <5 and the clarity value was 6.4.

*Example 4*

A film was prepared and tested in accordance with the process and methods employed in Example 1, test 1, using ammonia as the bubble-inflating agent, except that 10,000 p.p.m. behenic acid was used as the monocarboxylic acid in the plastic composition. The blocking value was <5 and the clarity value was 6.3.

The above examples show that plastic films having reduced tendency to block are obtained when made in accordance with this invention with the presence of both the ammonia in the inflating agent and the monocarboxylic acid in the thermoplastic material. The data further show that the absence of either agent defeats the purpose of the invention.

What is claimed is:

1. In a process for producing thermoplastic film by extruding a thermoplastic film-forming material to form a plastic tubing, inflating the tubing with a gaseous inflating agent to form a plastic bubble, cooling and thereafter collapsing the bubble and collecting the film, the improvement which comprises admixing with the thermoplastic film-forming material before extrusion a minor proportion of a saturated aliphatic monocarboxylic acid having from 12 to 22 carbon atoms per molecule, extruding the resulting thermoplastic mixture at an elevated temperature to form a seamless plastic tubing, inflating said tubing with a gaseous inflating agent, said inflating agent containing a reagent reacting with the reactive groups of the monocarboxylic acid on the inside surface of the resulting blown plastic bubble, cooling and collapsing the blown bubble by constricting means, and collecting the resulting film.

2. The improvement of the process of claim 1 wherein the thermoplastic film-forming material is a terpolymer of ethylene, vinyl acetate and propylene.

3. The improvement of the process according to claim 1 wherein the monocarboxylic acid is lauric acid.

4. The improvement of the process according to claim 1 wherein the monocarboxylic acid is palmitic acid.

5. The improvement of the process according to claim 1 wherein the monocarboxylic acid is stearic acid.

6. The improvement of the process according to claim 1 wherein the monocarboxylic acid is behenic acid.

7. The improvement of the process according to claim 1 wherein the monocarboxylic acid is present in an amount from about 0.02 percent to about 2 percent based on the weight of the polymer.

8. In a process for producing thermoplastic film by extruding a thermoplastic film-forming material to form a plastic tubing, inflating the tubing with a gaseous inflating agent to form a plastic bubble, cooling and thereafter collapsing the bubble and collecting the film, the improvement which comprises admixing with the thermoplastic film-forming material before extrusion a minor proportion of a saturated aliphatic monocarboxylic acid having from 12 to 22 carbon atoms per molecule, extruding the resulting thermoplastic mixture at an elevated temperature to form a seamless plastic tubing, inflating said tubing with an ammonia-containing inflating agent, said ammonia reacting with the reactive groups of the monocarboxylic acid on the inside surface of the resulting blown plastic bubble, cooling and collapsing the blown bubble by constricting means, and collecting the resulting film.

9. In a process for producing thermoplastic film by extruding a thermoplastic film-forming material to form a plastic tubing, inflating the tubing with a gaseous inflating agent to form a plastic bubble, cooling and thereafter collapsing the bubble and collecting the film, the improvement which comprises admixing a terpoylmer of ethylene, vinyl acetate and propylene and a minor proportion of stearic acid, extruding the resulting mixture at a temperature of about 350° F. to form a seamless plastic tubing, inflating said tubing with gaseous ammonia, said ammonia reacting with the reactive groups of the stearic acid on the inside surface of the blown plastic bubble to form the anti-block agent, collapsing the inflated tubing by constricting means and collecting the resulting film.

References Cited by the Examiner

UNITED STATES PATENTS

| | | | |
|---|---|---|---|
| 2,690,592 | 10/1954 | Schanz | 264—209 X |
| 3,090,998 | 5/1963 | Heisterkamp et al. | 264—95 |
| 3,172,930 | 3/1965 | Johnson et al. | 264—209 X |

ROBERT F. WHITE, *Primary Examiner.*

L. S. SQUIRES, *Assistant Examiner.*